(12) United States Patent
Hsu

(10) Patent No.: US 10,712,491 B2
(45) Date of Patent: Jul. 14, 2020

(54) DISPLAY

(71) Applicant: Chiun Mai Communication Systems, Inc., New Taipei (TW)

(72) Inventor: Chen-Sheng Hsu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 16/161,631

(22) Filed: Oct. 16, 2018

(65) Prior Publication Data
US 2019/0137681 A1 May 9, 2019

(30) Foreign Application Priority Data

Oct. 25, 2017 (CN) .......................... 2017 1 1015981

(51) Int. Cl.
*F21V 8/00* (2006.01)
(52) U.S. Cl.
CPC ......... *G02B 6/0085* (2013.01); *G02B 6/0055* (2013.01); *G02B 6/0088* (2013.01)
(58) Field of Classification Search
CPC ... G02B 6/0085; G02B 6/0088; G02B 6/0055
See application file for complete search history.

(56) References Cited

U.S. PATENT DOCUMENTS

| 2015/0177448 | A1* | 6/2015 | Yu | G02B 6/0085 |
| | | | | 362/606 |
| 2015/0226913 | A1* | 8/2015 | Shimizu | G02B 6/0085 |
| | | | | 348/836 |
| 2015/0316710 | A1* | 11/2015 | Liu | G02B 6/0093 |
| | | | | 362/615 |
| 2016/0282551 | A1* | 9/2016 | Kim | G02B 6/0091 |
| 2016/0320542 | A1* | 11/2016 | You | G02B 6/009 |
| 2016/0381317 | A1* | 12/2016 | Hosoki | G02B 6/0083 |
| | | | | 349/65 |
| 2017/0123138 | A1* | 5/2017 | Sasaki | G02B 6/0031 |
| 2018/0149806 | A1* | 5/2018 | Li | G02B 6/0023 |
| 2019/0049773 | A1* | 2/2019 | Woo | G02B 6/0088 |

FOREIGN PATENT DOCUMENTS

CN 102777814 A 11/2012

* cited by examiner

Primary Examiner — Kevin Quarterman
(74) Attorney, Agent, or Firm — ScienBiziP, P.C.

(57) ABSTRACT

A display which is able to dissipate heat from points of concentrated heat generation in a backlight module is provided, which includes the backlight module and a cooling module. The cooling module includes a cooling member and a buffer member. The cooling member is a flat sheet, and the cooling member is made of heat-dissipation material. The cooling member is positioned on a surface of the backlight module. The buffer member is made of soft material with adhesiveness and with elasticity. The buffer member is directly adhered on the cooling member through the adhesiveness of the buffer member to fix the cooling member to the backlight module.

12 Claims, 3 Drawing Sheets

DISPLAY

FIELD

The subject matter herein generally relates to a display.

BACKGROUND

With the development of science and technology, the light emitting diodes of the backlight module of the display are getting smaller and smaller. The brightness of the light emitting diodes is increasing. As a result, the light emitting diodes form a single concentrated heat source that is becoming more and more concentrated, heat dissipation is a problem.

BRIEF DESCRIPTION OF THE DRAWINGS

Implementations of the present technology will now be described, by way of example only, with reference to the attached figures.

DETAILED DESCRIPTION

Figure 1:
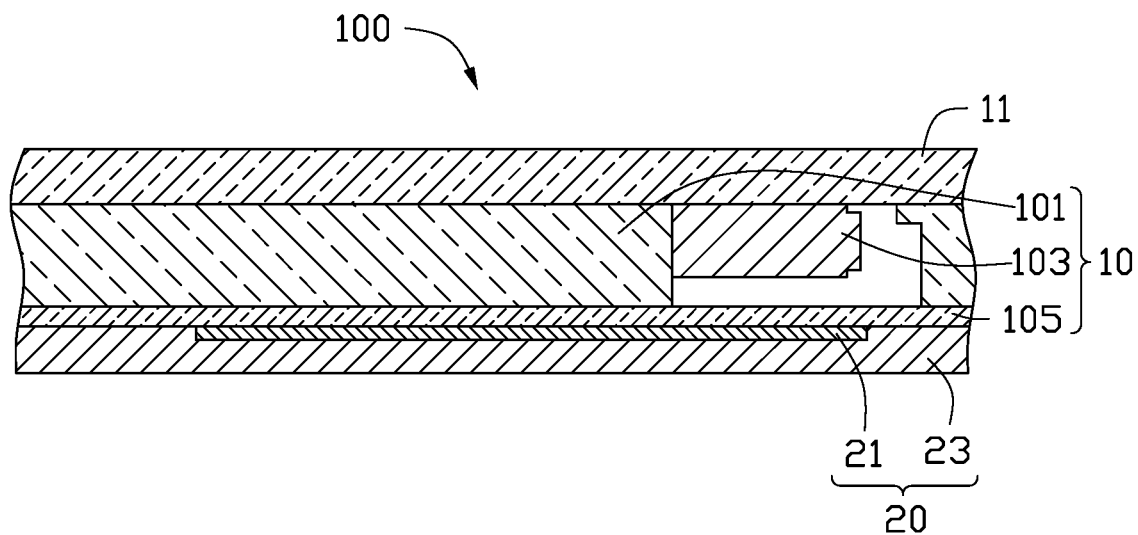
FIG. 1 is a cross-sectional view of an exemplary embodiment of a display.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiment described herein can be practiced without these specific details. In other instances, methods, procedures, and components have not been described in detail so as not to obscure the related relevant feature being described. Further, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

FIG. 1 illustrates an exemplary embodiment of a display 100. The display 100 can be applied to an electronic device such as a mobile phone, a computer, a television, or a game console. The display 100 includes at least a display panel 11, a backlight module 10, and a cooling module 20.

The display panel 11 can be a liquid crystal display panel. The backlight module 10 is positioned under the display panel 11. The backlight module 10 includes a light guide plate 101, a light source 103, and a reflective sheet 105. The light source 103 is positioned adjacent to the light guide plate 101. The light guide plate 101 is positioned between the display panel 11 and the reflective sheet 105. In the embodiment, the light source 103 is a point light source. For example, the light source 103 can be a light emitting diode. The light emitting diode does generate point heat source. The reflective sheet 105 is directly positioned on the surface of the light guide plate 101 which is away from the display panel 11.

Figure 2:
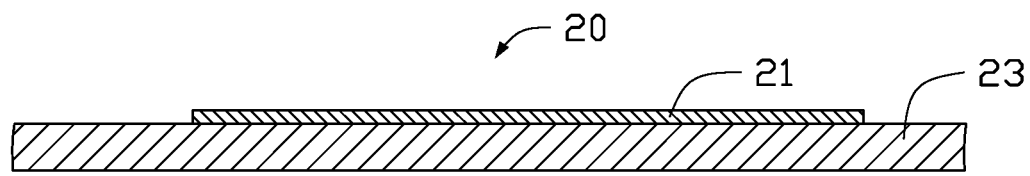
FIG. 2 is a view of an exemplary embodiment of a cooling module of the display.
Figure 3:
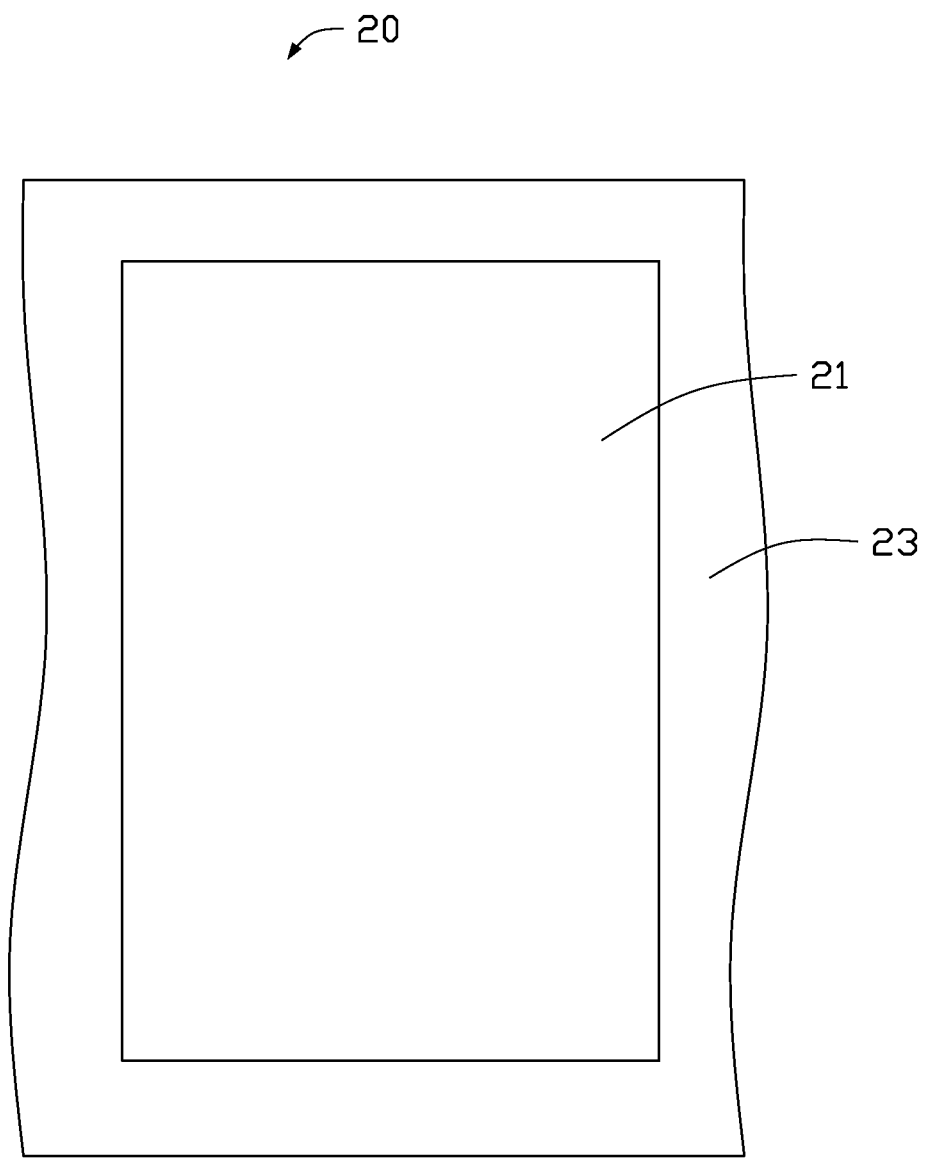
FIG. 3 is another view of the cooling module of the display.

Referring to FIG. 2 and FIG. 3, FIG. 2 is a side view of the cooling module 20. FIG. 3 is schematic top view of the cooling module 20. The cooling module 20 includes a cooling member 21 and a buffer member 23. The cooling member 21 is a flat sheet. The cooling member 21 is directly attached on the surface of reflective sheet 105 away from the light guide plate 101, and the cooling member 21 is positioned to correspond to the light source 103. In other words, the cooling member 21 is positioned on the side of the light source 103 which is away from the display panel 11. In this embodiment, the cooling member 21 has a shape and a size smaller than those of the reflective sheet 105. In another embodiment, the shape and size of the cooling member 21 also can be adjusted, under the condition that the area of the cooling member 21 is larger than the area of the light source 103.

In this embodiment, the cooling member 21 is a flat sheet made of heat-dissipation material. In this way, the cooling member 21 can diffuse the point heat source generated by the light source 103 to cool the light source 103, so as to solve the heat dissipation problem of the light source 103. In order to improve the heat dissipation performance of the cooling member 21, the cooling member 21 can be made of a heat-dissipation material having a good thermal conductivity such as a graphite sheet or a copper foil. The cooling member 21 is preferably has a thickness of about 0.01 mm to 0.2 mm.

The buffer member 23 is a flat sheet. The buffer member 23 is directly positioned on surfaces of the cooling member 21 and the reflective sheet 105 which are away from the light guide plate 101. Alternatively, the buffer member 23 is directly positioned on the surface of the cooling member 21 which is away from the reflective sheet 105. In this embodiment, the shape and size of the buffer member 23 substantially match with those of the display panel 11. The buffer member 23 is made of soft material with adhesiveness and with elasticity. In this way, the buffer member 23 can stick to the surfaces of the cooling member 21 and the reflective sheet 105 which are away from the light guide plate 101 through the adhesiveness of the buffer member 23. For example, when the size of the cooling member 21 is smaller than the size of the reflective sheet 105, portions of the buffer member 23 corresponding to the cooling member 21 are directly attached to the surface of the cooling member 21 which is away from the light guide plate 101. The other portions of the buffer member 23 are directly attached to the surface of the reflective sheet 105 which is away from the light guide plate 101.

In this embodiment, the buffer member 23 is made of adhesive foam, such as acrylic foam. The buffer member 23 has a viscosity range from 0.01N/25 mm to 3N/25 mm, which is the required force to tear off the buffer member 23 having a standard length of 25 mm.

The cooling member 21 is directly attached to the reflective sheet 105 through the adhesiveness of the buffer member 23. The buffer member 23 is positioned to correspond to the light source 103. In this way, the point heat source generated by the light source 103 can be evenly dissipated. The cooling member 102 does not need extra adhesive, which effectively reduce the thickness of the display 100 and reduce the manufacturing cost. In addition, due to the micro-adhesive property of the buffer member 23, the buffer member 23 can be easily detached from the backlight module 10, so reworking is easy. In addition, the buffer member 23 is made of elastic and soft material, which does not generate air bubbles and is flatter than the buffer member 23 which is attached to the cooling member 21 and the reflective sheet 105 through only the adhesive. As a result, ripples in the display 100 are avoided, and the buffering effect of the buffer member 23 is better. The heat-expansion and cold-contraction of the buffer member 23 are not obvious, so heat-expansion of the reflective sheet 105 is not problematic.

Figure 4:
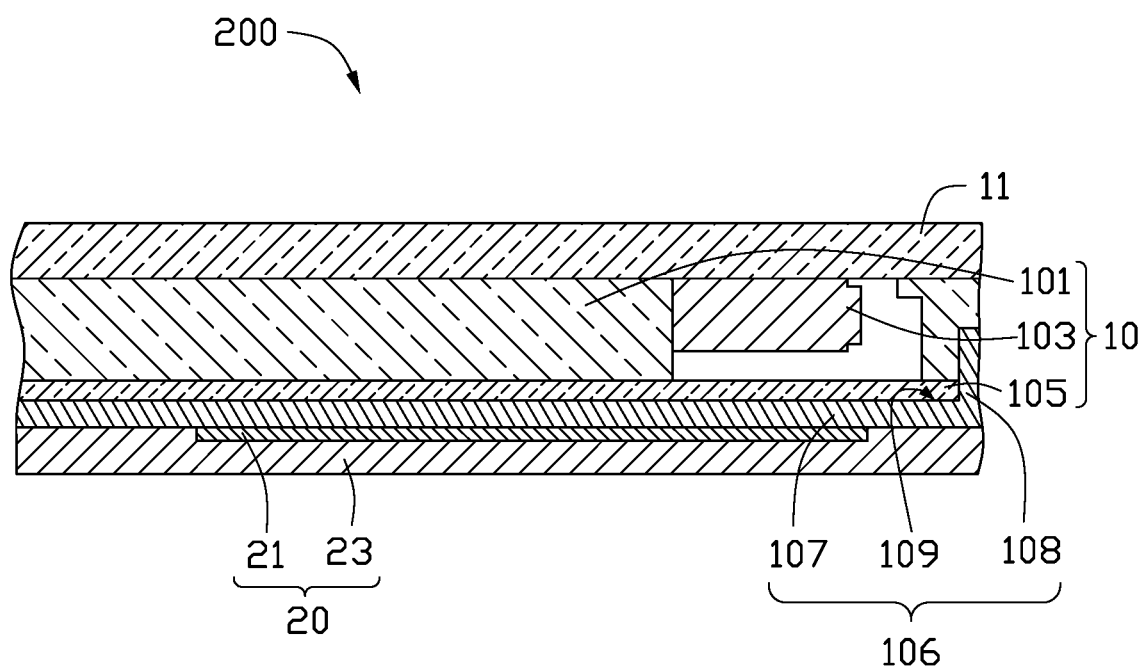
FIG. 4 is a cross-sectional view of another exemplary embodiment of a display.

Referring to FIG. 4, a second exemplary embodiment of the present disclosure provides a display 200. The display 200 includes a display panel 11, a backlight module 10, and a cooling module 20. The display 200 is different from the display 100 in that the display 200 further includes a metal frame 106. The metal frame 106 includes a bottom plate 107 and a side frame 108. The bottom plate 107 is directly positioned on the surface of the reflective sheet 105 which is away from the light guide plate 101. The side frame 108 is positioned on a periphery of the bottom plate 107. The side frame 108 is substantially perpendicular to the bottom plate 107, and extends from the periphery of the bottom plate 107. In this way, the side frame 108 and the bottom plate 107 formed an accommodating portion 109 for accommodating the light guide plate 101, the light source 103, and the reflective sheet 105.

In this embodiment, the cooling member 21 is directly positioned on a surface of the bottom plate 107 which is away from the reflective sheet 105. The buffer member 23 is adhered to the surfaces of the cooling member 21 and the bottom plate 107 which are away from the reflective sheet 105. For example, portions of the buffer member 23 corresponding to the cooling member 21 are directly attached to the surface of the cooling member 21 which is away from the reflective sheet 105. The other portions of the buffer member 23 are directly attached to the surface of the bottom plate 107 which is away from the reflective sheet 105.

In the display 100 or the display 200, the cooling member 21 is attached to a surface of the reflective sheet 105 or the metal frame 106 which is away from the light guide plate 101 through the adhesiveness of the buffer member 23. The cooling member 21 does not need extra adhesive, which reduce the thickness of the display 100 or the display 200 and reduce the manufacturing cost. In addition, the buffer member 23 is made of an elastic and soft material, which does not generate air bubbles and is flatter than the buffer member 23 which is attached to the cooling member 21 and the reflective sheet 105 through only the back adhesive. As a result, there are no ripples, and the buffering effect of the buffer member 23 is better.

It is to be understood, however, that even through numerous characteristics and advantages of the present disclosure have been set forth in the foregoing description, together with details of assembly and function, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A display comprising:
    a backlight module; and
    a cooling module, wherein the cooling module comprises a cooling member and a buffer member, the cooling member is a flat sheet composed of heat-dissipation material, the cooling member is positioned on a surface of the backlight module, the buffer member is made of soft material with adhesiveness and with elasticity, the buffer member is directly adhered on the cooling member through the adhesiveness of the buffer member, to fix the cooling member to the backlight module.

2. The display of claim 1, wherein the display further comprises a display panel, the backlight module is positioned under the display panel, the backlight module comprises a light guide plate, a light source and a reflective sheet, the light source is positioned adjacent to the light guide plate, the reflective sheet is directly positioned on a surface of the light guide plate which is away from the display panel, and the cooling member is positioned corresponding to the light source.

3. The display of claim 2, wherein the buffer member is made of adhesive foam, and a shape and a size of the buffer member match with those of the display panel.

4. The display of claim 3, wherein the cooling member is directly positioned on a surface of the reflective sheet which is away from the light guide plate.

5. The display of claim 4, wherein the buffer member is directly positioned on surfaces of the cooling member and the reflective sheet which are away from the light guide plate.

6. The display of claim 5, wherein the cooling member is directly attached to the reflective sheet through the adhesiveness of the buffer member, portions of the buffer member corresponding to the cooling member are directly attached to the surface of the cooling member which is away from the light guide plate, the other portions of the buffer member are directly attached to the surface of the reflective sheet which is away from the light guide plate.

7. The display of claim 3, wherein the display further comprises a metal frame, the metal frame comprises a bottom plate and a side frame, the bottom plate is directly positioned on a surface of the reflective sheet which is away from the light guide plate, the side frame is positioned on a periphery of the bottom plate, and the side frame is perpendicular to the bottom plate, the side frame extends from the periphery of the bottom plate, the side frame and the bottom plate formed an accommodating portion for accommodating the light guide plate, the light source and the reflective sheet.

8. The display of claim 7, wherein the cooling member is directly positioned on a surface of the bottom plate which is away from the reflective sheet.

9. The display of claim 8, wherein the buffer member is positioned on surfaces of the cooling member and the bottom plate which are away from the reflective sheet.

10. The display of claim 9, wherein the cooling member is directly attached to the bottom plate through the adhesiveness of the buffer member, portions of the buffer member corresponding to the cooling member are directly attached to the surface of the cooling member which is away from the reflective sheet, the other portions of the buffer member are directly attached to the surface of the bottom plate which is away from the reflective sheet.

11. The display of claim 1, wherein the cooling member is a graphite sheet or a copper foil.

12. The display of claim 1, wherein the buffer member is directly adhered on the cooling member through the buffer member and without extra adhesive.

* * * * *